US007838104B2

(12) United States Patent
Chen et al.

(10) Patent No.: US 7,838,104 B2
(45) Date of Patent: *Nov. 23, 2010

(54) VARIABLE VAPOR BARRIER FOR HUMIDITY CONTROL

(75) Inventors: John Chu Chen, Hockessin, DE (US); Donna Lynn Visioli, Lower Gwynedd, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 240 days.

This patent is subject to a terminal disclaimer.

(21) Appl. No.: 11/953,700

(22) Filed: Dec. 10, 2007

(65) Prior Publication Data
US 2008/0160280 A1    Jul. 3, 2008

Related U.S. Application Data

(60) Provisional application No. 60/877,994, filed on Dec. 29, 2007.

(51) Int. Cl.
*B32B 13/12* (2006.01)
*B32B 15/08* (2006.01)
*B32B 21/08* (2006.01)
*B32B 23/08* (2006.01)
*B32B 27/08* (2006.01)

(52) U.S. Cl. .............. 428/292.4; 428/292.7; 428/457; 428/461; 428/463; 428/500; 428/507; 428/511; 428/514; 428/515; 428/520; 52/309.1

(58) Field of Classification Search ............ None
See application file for complete search history.

(56) References Cited

U.S. PATENT DOCUMENTS

| 6,808,772 | B2 | 10/2004 | Kunzel |
| 6,878,455 | B2 | 4/2005 | Kunzel |
| 6,890,666 | B2 | 5/2005 | Kunzel |
| 7,514,380 | B2 * | 4/2009 | Chen et al. ............ 442/394 |
| 2003/0215609 | A1 | 11/2003 | Burkart |
| 2004/0103603 | A1 | 6/2004 | Kunzel |
| 2004/0103604 | A1 | 6/2004 | Kunzel |
| 2004/0103605 | A1 | 6/2004 | Kunzel |
| 2004/0103607 | A1 | 6/2004 | Kunzel |
| 2004/0245391 | A1 | 12/2004 | Kunzel |

FOREIGN PATENT DOCUMENTS

| WO | WO 96/33321 A1 | 10/1996 |
| WO | WO 03/042037 A1 | 5/2003 |
| WO | WO 03/044294 A1 | 5/2003 |
| WO | 2004/050362 A1 | 6/2004 |
| WO | 2007/146389 A1 | 12/2007 |
| WO | 2007/146391 A2 | 12/2007 |

OTHER PUBLICATIONS

PCT International Search Report for International application No. PCT/US2007/026440, dated Jul. 29, 2008.

* cited by examiner

*Primary Examiner*—Monique R Jackson

(57) ABSTRACT

Disclosed is a multilayer film or sheet, which comprises at least one vapor barrier layer and at least one vapor transmission-adjusting layer wherein the vapor transmission-adjusting layer comprises a neutralized acid copolymer or ionomer thereof, an organic acid, and optionally other polymers, having a ratio of wet cup permeance to dry cup permeance greater than 10. The vapor barrier layer comprises ethylene polymer, propylene polymer, polyvinyl alcohol, polyamide, polyester, ethylene vinyl alcohol copolymer, polyvinylidene chloride, PVC, or combinations of two or more thereof. The film is useful as a variable vapor barrier for moisture control of buildings. Also disclosed are articles comprising the multilayer film.

20 Claims, No Drawings

VARIABLE VAPOR BARRIER FOR HUMIDITY CONTROL

This application claims priority to U.S. provisional application Ser. No. 60/877,994, filed Dec. 29, 2006, the entire disclosure of which is incorporated herein by reference.

This invention relates to an article including a multilayer film or sheet that can self-adjust to achieve variable moisture permeance under different ambient humidity conditions.

BACKGROUND OF THE INVENTION

Confined spaces such as building interiors and packaging may have limited exchange of moisture vapor with adjacent or external environmental spaces. Materials having moisture permeance that is variable when exposed to different ambient conditions can provide benefits in such fields as construction, packaging, etc.

Buildings are commonly equipped with thermal insulation in order to provide comfortable living conditions inside the building. In addition to insulation, buildings are also constructed with various air barrier materials to limit air and water infiltration into the structure of the building. These air barriers minimize heat loss through draft flow.

In addition to air barriers, vapor barriers have also been used for controlling flow of moisture. Such vapor barriers reduce the potential for moisture condensation in the interior wall cavity space as the water vapor is exposed to the cold exterior temperatures in the winter season. A material that acts as a vapor barrier during winter but facilitates vapor permeation during hot, humid summer conditions is desirable. U.S. Pat. Nos. 6,808,772; 6,878,455 and 6,890,666 disclose applications of a polyamide building liner material that has a water vapor diffusion resistance (WVDR) of from 2 to 5 meters diffusion-equivalent air space width at a relative humidity (RH) of an atmosphere surrounding the vapor barrier between 30% and 50% and a WVDR of less than 1 meter diffusion-equivalent air space width at a relative humidity between 60% and 80%. See also, Patent Application Publications US2003/0215609.

Variable vapor permeance can also be desirable of packaging for packaging of food items such as fresh produce to have low moisture permeance under conditions of typical cold storage (low temperatures and low humidity) to retain moisture within the package, thereby retarding desiccation of the produce and maintaining freshness.

However, water vapor transmission rate (WVTR) of variable vapor barrier increases in a logarithmic manner as relative humidity increases. It is desirable to limit the maximum WVTR, or to specify the relative humidity at which the WVTR increases dramatically.

SUMMARY OF THE INVENTION

This invention provides a multilayer film, which includes sheet, comprising or consisting essentially of or consisting of a vapor barrier layer and vapor transmission-adjusting layer wherein the vapor transmission adjusting layer can comprise or be produced from an ethylene copolymer and one or more organic carboxylic acids having fewer than 36 carbon atoms, or salts thereof and the vapor barrier layer is not sensitive to humidity or humidity changes.

DETAILED DESCRIPTION OF THE INVENTION

High WVTR means $\geq 200$, $\geq 1000$, $\geq 5000$, or $\geq 10,000$ g-mil/m$^2$-24 h when measured at about 100% RH.

The ethylene copolymer can be an acid copolymer, or an ionomer thereof, comprising repeat units derived from ethylene, one or more $C_{3-8}$ $\alpha,\beta$-ethylenically unsaturated carboxylic acids, and optionally a softening comonomer. The repeat units derived from carboxylic acid can be from about 2 to about 35, 4 to 25, or 5 to 20, weight % of the ethylene copolymer and those derived from the softening comonomer can be 0 to about 35, about 0.1 to about 35, or 5 to 30, weight % of the ethylene copolymer.

Examples of $\alpha,\beta$-ethylenically unsaturated carboxylic acid include (meth)acrylic acid which includes acrylic acid or methacrylic acid or both, maleic acid, fumaric acid, itaconic acid, monoesters of fumaric acid or maleic acid (maleic half esters) including esters of $C_1$ to $C_4$ alcohols such as for example, methyl, ethyl, n-propyl, isopropyl and n-butyl alcohols, or combinations of two or more thereof.

Examples of softening comonomers include one or more alkyl (meth)acrylates with the alkyl groups having 1 to 8 or 1 to 4 carbon atoms.

Ethylene acid copolymers are well known to one skilled in the art such as disclosed in U.S. Pat. No. 5,028,674, the disclosure of which is incorporated herein by reference.

Examples of acid copolymers include ethylene/(meth)acrylic acid copolymers. They also include ethylene/(meth)acrylic acid/n-butyl (meth)acrylate, ethylene/(meth)acrylic acid/iso-butyl(meth)acrylate, ethylene/(meth)acrylic acid/methyl(meth)acrylate, ethylene/(meth)acrylic acid/ethyl (meth)acrylate terpolymers, or combinations of two or more thereof. Other acid copolymers include ethylene/maleic acid and ethylene/maleic acid monoester dipolymers; and ethylene/maleic acid monoester/n-butyl(meth)acrylate, ethylene/maleic acid monoester/methyl (meth)acrylate, ethylene/maleic acid monoester/ethyl(meth)acrylate terpolymers, or combinations of two or more thereof.

An ionomer of the acid copolymer can have about 1 to about 90% or about 40 to about 75% of the acid moieties nominally neutralized by one or more alkali metal, alkaline earth metal, or transition metal compounds with alkali metal such as Na, K, or combinations thereof as predominant metal ions.

The amount of metal compound neutralizing acid groups may be provided by adding the stoichiometric amount of the basic compound calculated to neutralize a target amount of acid moieties in the acid copolymer and organic acid(s) in the blend (hereinafter referred to as "% nominal neutralization" or "nominally neutralized"). Nominal neutralization levels of all acid moieties in the composition are at least 70, 80, or 90%, or even 100%.

Metal compounds include formates, acetates, nitrates, carbonates, hydrogencarbonates, oxides, hydroxides or alkoxides of the ions of alkali metals, especially sodium and potassium, and formates, acetates, nitrates, oxides, hydroxides or alkoxides of the ions of alkaline earth metals and transition metals.

The organic acids can be monobasic, dibasic, or polybasic carboxylic acids, or salts thereof and can be present in the composition from about 1 to about 50 weight %. Examples of organic acids include $C_4$ to less than $C_{36}$ (such as $C_{34}$, $C_{4-26}$, $C_{6-22}$, or $C_{12-22}$).

The organic acids can be substituted with from one to three substituents independently selected from the group consisting of $C_1$-$C_8$ alkyl, OH, and OR$^1$ in which each R$^1$ is independently $C_1$-$C_8$ alkyl, $C_1$-$C_6$ alkoxyalkyl or COR$^2$; and each R$^2$ is independently H or $C_1$-$C_8$ alkyl.

Saturated, branched organic acids are acids comprising at least one CH (methenyl) moiety and at least two CH$_3$ (methyl)

moieties. In contrast, saturated, linear organic acids (e.g., behenic acid) are acids comprising only one $CH_3$ and no CH moieties.

Hydroxy-substituted organic acids includes those substituted with a hydroxyl (—OH) moiety as well as derivatives thereof and can be substituted with one OH or one $OR^1$.

Examples of organic acids include, but are not limited to, caproic acid, caprylic acid, capric acid, lauric acid, stearic acid, isostearic acid, behenic acid, erucic acid, oleic acid, hydroxy-stearic acid, and linoleic acid. Naturally derived organic fatty acids such as palmitic, stearic, oleic, erucic, behenic acids, hydroxy-stearic acid, or combinations of two or more thereof.

Salts of any of these organic acids may include the alkali metal salts. For example, the metal ions present in the final composition comprise at least 50% sodium or potassium or both ions. Smaller amounts of salts of alkaline earth metal and/or or transition metal ions may be present in addition to the alkali metal salts.

Greater than 70%, 80% or 90% (or even 100%) acidic groups in the ethylene copolymer or ionomer and organic acids are nominally neutralized with metal ions; and the metal ions present in the mixture can comprise at least 50 mole %, for example, Na or K ions and the balance may be other metal ions such as alkali metal ions.

The vapor transmission-adjusting layer can comprise or be produced from about 0.1 to about 25, to about 15, or to about 10, weight %, based on the vapor transmission-adjusting layer, of one or more optional polymers. For example, for the composition comprising 2 or weight % to 25 weight % organic acids, the optional polymer may be present in the composition from 5 to 20 weight %. Blending with such polymers may provide better processability, improved toughness, strength, flexibility, compatibility of the blend when adhering to a substrate as described below.

The optional polymer includes ethylene polymer, propylene polymer, anhydride- or acid monoester-modified polymer, or combinations of two or more thereof.

Ethylene polymer can include polyethylene (PE) homopolymers, PE copolymers, ethylene copolymer having a polar comonomer, or combinations of two or more thereof in which the ethylene copolymer includes ethylene (meth)acrylate copolymer, ethylene vinyl acetate copolymer (EVA), ethylene n-butylacrylate carbon monoxide copolymer (EBACO), ethylene vinyl acetate carbon monoxide copolymer (EVACO), or combinations of two or more thereof. The ethylene copolymer having a polar comonomer can comprise an optional comonomer including alkyl (meth)acrylate.

PE homopolymers and copolymers can be prepared by a variety of methods, for example, the well-known Ziegler-Natta catalyst polymerization, metallocene catalyzed polymerization, Versipol® catalyzed polymerization and by free radical polymerization. Examples of PE polymers can include high density PE (HDPE), linear low density PE (LLDPE), low density PE (LDPE), very low or ultra low density polyethylenes (VLDPE or ULDPE), lower density PE made with metallocene having high flexibility and low crystallinity (mPE). The PE copolymer may also be an ethylene propylene elastomer containing a small amount of unsaturated compounds having a double bond. Ethylene copolymers having small amounts of a diolefin component such as butadiene, norbornadiene, hexadiene and isoprene are also generally suitable. Terpolymers such as ethylene/propylene/diene monomer (EPDM) are included herein.

An ethylene/alkyl(meth)acrylate copolymer, which includes repeat units derived from ethylene, one or more $C_{1-8}$ alkyl(meth)acrylates, and optionally an acid cure site. Examples of alkyl(meth)acrylates include methyl acrylate, ethyl acrylate and butyl acrylate. Examples of the copolymers include ethylene/methyl acrylate copolymer ethylene/ethyl acrylate copolymer, ethylene/butyl acrylate copolymer, or combinations of two or more thereof.

Alkyl(meth)acrylate may be incorporated into an ethylene/alkyl (meth)acrylate copolymer a few weight % up to as high as 45 weight % of the copolymer or even higher such as 5 to 45, 10 to 35, or 10 to 28, weight %. Frequently used alkyl group is methyl, ethyl, iso-butyl, or n-butyl.

Tubular reactor produced ethylene/alkyl(meth)acrylate copolymers, are commercially available from E. I. du Pont de Nemours and Company, Wilmington, Del. (DuPont) such as Elvaloy®. A mixture of two or more different ethylene/alkyl (meth)acrylate copolymers can be used.

The comonomer may be an acid, an acid anhydride, an ester of the acid such as monoalkyl ester. The acid can be a 1,4-butene-dioic acid, and its esters, which can exist in either cis or trans form, such as maleic acid, fumaric acid, maleic acid methyl ester, maleic acid ethyl ester, maleic acid propyl esters, maleic acid butyl esters, maleic acid pentyl ester, maleic acid hexyl esters, fumaric acid methyl ester, fumaric acid ethyl ester, fumaric acid propyl ester, or combinations of two or more thereof. Repeat units derived from acid cure site monomer can comprise from about 0.1 to about 10, about 0.5 to about 7, about 1 to about 6, or 2 to 5 weight % of the ethylene copolymer. The rest can be derived from ethylene.

The ethylene polymer may also include repeat units derived from ethylene and at least one polar monomer such as ethylene/vinyl acetate copolymers (EVA), ethylene/acrylic ester copolymers, ethylene/methacrylic ester copolymers, ethylene/vinyl acetate/CO copolymers (EVACO), ethylene/acrylic ester/CO copolymers, ethylene/maleic anhydride copolymers, and/or mixtures of any of these.

EVA includes copolymers comprising repeat units derived from ethylene and vinyl acetate or the copolymerization of ethylene, vinyl acetate, and an additional comonomer. The relative amount of the vinyl acetate comonomer incorporated into EVA can vary from a few (e.g., 3) weight % up to as high as 45 weight % of the total copolymer or even higher. For example, EVA copolymer may have 2 to 45 or 6 to 30, weight % derived from vinyl acetate. EVA may optionally be modified by methods well known in the art, including modification with an unsaturated carboxylic acid or its derivatives, such as maleic anhydride or maleic acid. EVA is commercially available, such as Elvax® from DuPont. A mixture of two or more different ethylene/vinyl acetate copolymers can be used.

The ethylene polymer can include an ethylene acid copolymer or ionomer thereof. The acid copolymer comprises repeat units derived from ethylene, a carboxylic acid, and optionally additional comonomer disclosed above where the carboxylic acid includes (meth)acrylic acid, formic acid, maleic acid, or combinations of two or more thereof. The ionomer of the acid copolymer can have the acid groups neutralized as disclosed above. Commercially available acid copolymer and ionomer include Nucrel® and Surlyn® from DuPont.

The ethylene polymers are well known to one skilled in the art. For example, ethylene/alkyl(meth)acrylate copolymers can be prepared using either autoclave or tubular reactors. See, e.g., U.S. Pat. Nos. 2,897,183, 3,404,134, 5,028,674, 6,500,888, and 6,518,365. Therefore, further description of the polymers is omitted herein for the interest of brevity.

Propylene polymers include polypropylene (PP) homopolymers, random copolymers, block copolymers, terpolymers of propylene polypropylene homopolymers, or combinations of two or more thereof. Copolymers of propylene include copolymers of propylene with other olefins such as ethylene, 1-butene, 2-butene and the various pentene isomers, etc. and preferably copolymers of propylene with ethylene. Terpolymers of propylene include copolymers of propylene with ethylene and one other olefin. Random copolymers, also known as statistical copolymers, are polymers in which the propylene and the comonomer(s) are randomly distributed throughout the polymeric chain in ratios corresponding to the feed ratio of the propylene to the comonomer(s). Block copolymers are made up of chain segments consisting of propylene homopolymer and of chain segments consisting of, for example, random copolymers of propylene and ethylene.

Such propylene polymers are also well known to one skilled in the art and the description of which is omitted herein.

The polar comonomer in the ethylene copolymer having a polar comonomer can include a carboxylic acid and its derivative and an optional comonomer including alkyl(meth)acrylate. Carboxylic acid and its derivative can include (meth)acrylic acid, maleic acid, fumaric acid, itaconic acid, maleic acid monoester, maleic anhydride, salt thereof, or combinations of two or more thereof.

An anhydride- or acid monoester-modified polymer can comprise an unsaturated dicarboxylic acid anhydride or monoester including maleic anhydride, citraconic anhydride, tetrahydrophthalic anhydride, itaconic anhydride, maleic acid monoester, itaconic acid monoester, or combinations of two or more thereof. The modified polymer can be obtained by any known means, such as a process in which a PE homopolymer or copolymer, PP homopolymer or copolymer, EVA copolymer, or ethylene/alkyl acrylate copolymer, as disclosed above, is dissolved in an organic solvent with an unsaturated dicarboxylic acid anhydride or its functional equivalent and a radical generator, followed by heating with stirring; and a process in which all the components are fed to an extruder to provide a maleic-anhydride grafted ethylene copolymer. Grafting processes provide copolymers with from 0.1 to 3 weight % of anhydride units. These graft copolymers are available commercially as Fusabond® or Bynel® from DuPont.

The ethylene copolymer and organic acid for producing the vapor transmission-adjusting layer can be melt-processed by combining one or more ethylene copolymers, one or more carboxylic acids or salts thereof, the stoicheometric amount of neutralizing metal compound, and optionally one or more optional polymers to form a mixture; heating the mixture under a condition sufficient to produce a vapor transmission-adjusting composition. Heating can be carried out under a temperature in the range of from about 80 to about 350, about 100 to about 320, or 120 to 300° C. under a pressure that accommodates the temperature for a period from about 30 seconds to about 1 hour. Also for example, the composition can be produced by melt-blending an ethylene copolymer and/or ionomer thereof with one or more organic acids or salts thereof; concurrently or subsequently combining a sufficient amount of a basic metal compound capable of neutralization of the acid moieties to nominal neutralization levels greater than 70, 80, 90%, to near 100%, or to 100%; and optionally, combining an optional polymer disclosed above. A salt blend of components can be made or the components can be melt-blended in an extruder. For example, a Werner & Pfleiderer twin-screw extruder can be used to mix and treat the acid copolymer and the organic acid (or salt) with the metal compound at the same time. It is desirable that the mixing is conducted so that the components are intimately mixed, allowing the metal compound to neutralize the acidic moieties. Actual neutralization levels can be determined using infra red spectroscopy by comparing an absorption peak attributable to carboxylate anion stretching vibrations at 1530 to 1630 cm$^{-1}$ and an absorption peak attributable to carbonyl stretching vibrations at 1690 to 1710 cm$^{-1}$.

Treatment of acid copolymers and organic acids with metal compounds concurrently or subsequently, such as without the use of an inert diluent, may produce composition without loss of processability or properties such as toughness and elongation to a level higher than that which would result in loss of melt processability and properties for the ionomer alone.

The composition can additionally comprise small amounts of additives, ranging from about 0.01 to 15, 0.01 to 10, or 0.01 to 5, weight %, including plasticizers, stabilizers including viscosity stabilizers and hydrolytic stabilizers, primary and secondary antioxidants, ultraviolet ray absorbers, anti-static agents, dyes, pigments or other coloring agents, inorganic fillers, fire-retardants, lubricants, reinforcing agents such as glass fiber and flakes, synthetic (for example, aramid) fiber or pulp, antifog agents, foaming or blowing agents, processing aids, slip additives, antiblock agents such as silica or talc, release agents, tackifying resins, or combinations of two or more thereof. The incorporation of the additives can be carried out by any known process such as, for example, by dry blending, by extruding a mixture of the various constituents, by the conventional masterbatch technique, or the like.

The vapor barrier layer can comprise or be produced from ethylene polymer, ethylene copolymer having a polar comonomer, propylene polymer, polyvinyl alcohol (PVOH), polyamide, polyester, ethylene vinyl alcohol copolymers (EVOH), polyvinylidene chloride, polyvinyl chloride, polyester, an anhydride- or acid monoester-modified polymer, or combinations of two or more thereof.

Ethylene polymer, propylene polymer, ethylene copolymer having a polar comonomer, and anhydride- or acid monoester-modified polymer disclosed above are incorporated herein.

PVOH polymer is a well known polymer that is useful in the adhesives industry as well as in the paper industry. Because it is well known to one skilled in the art, further description of which is omitted herein for the interest of brevity. See, e.g., U.S. Pat. No. 6,688,0354.

Any polyamides known to one skilled in the art such as those produced from lactams or amino acids can be used. Polyamides from single reactants such as lactams or amino acids can include nylon 6, nylon 11, nylon 12, or combinations of two or more thereof. Polyamides prepared from more than one lactams or amino acids include nylon 6,12. Frequently used polyamides include nylon 6, nylon 9, nylon 10, nylon 11, nylon 12, nylon 6,12, nylon 6,6, nylon 6,10, nylon 6I, nylon 6T, nylon 6I 6T, nylon MXD6 (i.e., polymetaxylene adipate homo- and/or co-polyamides), or combinations of two or more thereof including polyamide nanocomposites such as those available commercially as Aegis™ from Honeywell or Imperm™ from Mitsubishi Gas Chemicals/Nanocor.

Because polyamide and process therefor are well known to one skilled in the art, the disclosure of which is omitted herein for the interest of brevity.

EVOH includes saponified or hydrolyzed ethylene/vinyl acetate copolymers, refers to a vinyl alcohol copolymer having about 27 to 44 mole % ethylene, and can be prepared by, e.g., hydrolysis of vinyl acetate copolymers. The degree of hydrolysis is preferably from about 50 to 100 mole %, or about 85 to 100 mole %. EVOH is available as Eval® from Kuraray (Evalca) and Noltex® from Nippon Goshei.

Polyester includes, for example, polyethylene terephthalate (PET), polypropylene terephthalate, polybutylene terephthalate (PBT), and blends with additional components such as modifiers and tougheners (e.g., PBT and/or PET blends). Polyester can also be a copolymer of PET comprising (or derived from) at least about 50 mole % PET and monomers other than terephthalic acid and ethylene glycol (or their ester forming equivalents). Other comonomers include for example succinic acid, adipic acid, azelaic acid, sebacic acid, glutaric acid, phthalic acid, isophthalic acid, dodecanedioic acid, propylene glycol, methoxypolyalkylene glycol, neopentyl glycol, trimethylene glycol, tetramethylene glycol, hexamethylene glycol, diethylene glycol, polyethylene glycol, or cyclohexane dimethanol. Because a polyester is so well known to one skilled in the art, the description of which is omitted herein for the interest of brevity.

The multilayer film (including sheet) can be produced by any means known to one skilled in the art such as coextruding the composition for producing the vapor barrier layer and the polymer for the vapor transmission-adjusting layer.

The film can be also attached to a carrier, which includes paper, paper board, nonwoven material, metal, plastic, wood, stone, particle board, chip board, oriented strand board, plywood paneling, gypsum board (standard or fiber reinforced), fiber board, cement board, cementitious wood wool board, calcium silica board, fiber insulation batts or slabs, foam insulation slabs, cloth, or combinations of two or more thereof; attached as a film or membrane or as a coating (extrusion coating, spraying, painting or other appropriate application methods). Extrusion coating the coextruded film containing the variable vapor barrier material onto paper can be done as follows: dried granulates of the blend (and granulates of compositions for other layers, if present) and the barrier resins are melted in two extruders. The molten polymer(s) are passed through a flat die to form a molten coextruded polymer curtain wherein the compositions of the individual layers are present in a laminar flow. The molten curtain drops onto the moving paper substrate to be immediately pressed into that substrate and quenched by a quench drum.

For example, the film can be applied as part of the wall, ceiling or roof construction of a building such as being attached to the framing members so that the film is between the insulating material and the interior sheathing; or as part of a structural component of the building that has a carrier. The carrier materials may be reinforced and can also comprise additional layers such as thermal insulation layer including fiber batt, fiber slab, foam, or combinations of two or more thereof.

Also for example, the multilayer film can be applied to a carrier as a film, coating layer, or laminated layer. The coating or laminate can be applied to one side or both sides of the carrier or between two layers of the carrier in a sandwich-like manner. To avoid hindering moisture transmission, the carrier can be such that the carrier has a water vapor diffusion that is greater than the water vapor diffusion of the multilayer film so that the water vapor diffusion characteristics of the structure are essentially provided by the multilayer film.

A coated paper can further comprises insulation batts or slabs, wherein the paper coated with the variable vapor barrier is a facing sheet for the insulation and can be applied as a backing sheet for a building panel comprising, for example, particle board, chip board, oriented strand board, plywood paneling, gypsum board (standard or fiber reinforced), fiber board, cement board, cementitious wood wool board, or calcium silica board.

Carrier, not wishing to be bound by theory, can provide support, shape, esthetic effect, protection, surface texture, bulk volume, weight, or combinations of two or more thereof to enhance the functionality and handability of the multilayer film.

The multilayer film may have a permeance (water vapor diffusion) that is dependent on the ambient humidity, allowing it to be used to prepare a variable vapor barrier. Such water or moisture vapor transmission can be measured by water vapor permeation values (WVPV) or WVTR as disclosed above, i.e., $\geq 200$ g-mil/m$^2$-24 h, $\geq 1000$, $\geq 5000$, or $\geq 10,000$ g-mil/m$^2$-24 h when measured at 100% relative humidity.

The multilayer film optionally has a ratio of wet cup permeance to dry cup permeance greater than 10, alternatively greater than 20, alternatively greater than 50, alternatively greater than 75, when measured according to ASTM E 96-00 at a temperature of 73° F. (23° C.), wherein wet cup permeance is determined at an average relative humidity of 75% and dry cup permeance is determined at an average relative humidity of 25%.

The multilayer film can be formed into a monolithic membrane that functions as a self-adjusted permeable barrier, which under high relative humidity conditions may perform substantially as microporous membranes that are permeable due to the presence of microscopic pores through which vapor can pass. Monolithic membranes, in contrast to microporous membranes, have high water-entry pressure and are waterproof and liquidproof and can provide good barriers to liquid water while still allowing permeability to water vapor under appropriate conditions. Monolithic membranes also are good in stopping draft flow to help minimize heat loss, can function as a barrier to odors, and possess tear strength compared to microporous membranes.

Permeance is a measure of the permeability of a material to water vapor divided by its thickness in inches and can be expressed in units of Perms (grains/h·ft$^2$·inches of Hg). The permeance of still air is 120 perms·inch (see Table 5.4, Page 158, *Thermal and Moisture Protection Manual*, Christine Beall, McGraw-Hill). Another measure of permeability is WVDR ($S_d$), which can be expressed in meters diffusion-equivalent air layer thickness. These measures can be related by the expression $3.048/S_d$=Permeance in Perms.

For illustration, the diffusion resistance expressed as $S_d$ of prior vapor barrier materials has been converted to permeance expressed in Perms and summarized below:

| Reference | Permeance (Perms) | |
| --- | --- | --- |
| US6,808,772 | 0.61 to 1.52 at 30 to 50% RH | Greater than 3.1 at 60 to 80% RH |
| US2003/0215609 | — | 0.03 to 6.09 at 60 to 80% RH |
| WO2002/070351 | 0.15 to 3 at 25% RH | 4.35 to 152 at 72.5% RH |

Average humidity below 50% is thought of as relatively dry conditions and average humidity above 60% is thought of as relatively humid conditions.

The multilayer film or sheet may have a total thickness of about 0.1 to about 50, about 0.1 to about 25, or 0.5 to 10 mils where the individual barrier layer can be about 0.05 to about 15, 0.05 to about 10, 0.05 to about 5, or 0.1 to 2 mils (1 mil=0.0254 mm).

Also disclosed are articles comprising the multilayer film such as building panel (including part or surface thereof), backing sheet for insulation, sheathing, metal roof, or timber post construction.

The following Examples are presented to illustrate the invention, but are not meant to be unduly limiting.

EXAMPLES

A coextruded film comprising a layer of transmission-adjusting layer is made from a layer comprising an ethylene acid copolymer-ionomer (19 wt % methacrylic acid) and 4% behenic acid where 93% of the acid groups are neutralized with Na ions and a layer comprising an ethylene copolymer (Elvaloy® AC 1330, containing 30 wt % methyl acrylate). The polymers in the layers are cast into films by coextrusion with thickness shown in the table using a 28 mm W&P twin screw extruder. Water vapor transmission rate (WVTR) of the cast film is calculated at 100% RH and shown in Table 1 where the transmission-adjusting layer is referred to as FAMI1 and the barrier layer is referred to as EMA1.

TABLE 1

| FAMI1, mil | EMA, mil | WVTR (mil-g/M2-day) |
|---|---|---|
| 0.1 | 0.9 | 648 |
| 0.2 | 0.8 | 715 |
| 0.25 | 0.75 | 753 |
| 0.4 | 0.6 | 899 |
| 0.5 | 0.5 | 1033 |
| 0.6 | 0.4 | 1213 |
| 0.75 | 0.25 | 1642 |
| 0.9 | 0.1 | 2540 |

A multilayer film comprising FAMI-2 layer and nylon 6 (PA) layer is similarly produced and is characterized in Table 2. FAMI-2 is made from an ethylene acid copolymer comprising 19 wt % methacrylic acid and 4 wt % hydroxy stearic acid where 88% of total acid group is neutralized with Na ions. A 2 mil FAMI-2 film has 0.26 and 48.1 perm for dry cup and wet cup, respectively. The PA layer is 2 mil film having 0.63 and 10.5 perm for dry cup and wet cup, respectively.

TABLE 2

| FAMI-2[1] | PA[1] | FAMI-2 layer[2] | PA layer[2] | Dry Cup[3] | Wet Cup[3] |
|---|---|---|---|---|---|
| 0.1 | 0.9 | 0.2 | 1.8 | 0.55 | 11.39 |
| 0.2 | 0.8 | 0.4 | 1.6 | 0.49 | 12.45 |
| 0.25 | 0.75 | 0.5 | 1.5 | 0.46 | 13.05 |
| 0.4 | 0.6 | 0.8 | 1.2 | 0.40 | 15.28 |
| 0.5 | 0.5 | 1 | 1 | 0.37 | 17.24 |
| 0.6 | 0.4 | 1.2 | 0.8 | 0.34 | 19.77 |
| 0.75 | 0.25 | 1.5 | 0.5 | 0.30 | 25.38 |
| 0.9 | 0.1 | 1.8 | 0.2 | 0.28 | 35.42 |

[1]gauge %
[2]thickness, mil
[3]Perm; 1/perm (coextruded) = f1/perm1 + f2/perm2

The invention claimed is:

1. An article comprising a carrier having attached, laminated, or coated thereon or therewith a monolithic membrane, which is a multilayer film comprising a vapor barrier layer and a vapor transmission-adjusting layer wherein the article is part of a structural component in the construction or renovation of a building and the structural component is a wall, ceiling or roof;

the vapor transmission-adjusting layer comprises or is produced from one or more ethylene copolymer and one or more organic acids having fewer than 36 carbon atoms, or salts thereof and has a high water vapor transmission rate ≧200 g-mil/m$^2$-24 hours when measured at 100% relative humidity;

the ethylene copolymer comprises an acid copolymer or an ionomer thereof;

the ethylene copolymer comprises repeat units derived from ethylene, one or more $C_{3-8}$ α,β-ethylenically unsaturated carboxylic acids, and optionally a softening comonomer;

the organic acid or salt thereof is present in the vapor transmission-adjusting layer from about 1 to about 50 weight % and the organic acid is optionally substituted with from one to three substituents independently selected from the group consisting of $C_1$-$C_8$ alkyl group, OH group, and $OR^1$ group;

each $R^1$ is independently $C_1$-$C_8$ alkyl group, $C_1$-$C_6$ alkoxyalkyl group, or $COR^2$ group;

each $R^2$ is independently H or $C_1$-$C_8$ alkyl group;

at least 60% acidic groups in the ethylene copolymer and the organic acid are nominally neutralized with one or more metal ions to the corresponding salts; the metal ions present in a mixture comprising at least 50 mole % of alkali metal ions;

the carrier includes paper, paper board, nonwoven material, metal, plastic, wood, stone, particle board, chip board, oriented strand board, plywood paneling, standard or fiber reinforced gypsum board, fiber board, cement board, cementitious wood wool board, calcium silica board, fiber insulation batt or slab, foam insulation slab, cloth, or combinations of two or more thereof; and the vapor transmission-adjusting layer has a ratio of wet cup permeance to dry cup permeance greater than 10 when measured according to ASTM E 96-00 at a temperature of 73° F.; the wet cup permeance is determined at an average relative humidity of 75% and the dry cup permeance is determined at an average relative humidity of 25%.

2. The article of claim 1 wherein the monolithic membrane is coextruded multilayer film.

3. The article of claim 2 wherein the α,β-ethylenically unsaturated carboxylic acid is acrylic acid or methacrylic acid and at least 70% of the acidic groups in the ethylene copolymer and the organic acid are neutralized.

4. The article of claim 2 wherein the vapor barrier layer comprises ethylene polymer, propylene polymer, ethylene copolymer having a polar comonomer, polyvinyl alcohol, polyamide, polyester, ethylene vinyl alcohol copolymer, an anhydride- or acid monoester-modified polymer, or combinations of two or more thereof;

the ethylene polymer includes polyethylene, ethylene vinyl acetate copolymer, ethylene acid copolymer or ionomer thereof, ethylene (meth)acrylate copolymer, or combinations of two or more thereof; and the propylene polymer includes polypropylene homopolymers, random copolymers, block copolymers, terpolymers of propylene polypropylene homopolymers, or combinations of two or more thereof.

5. The article of claim 4 wherein the α,β-ethylenically unsaturated carboxylic acid is acrylic acid or methacrylic acid.

6. The article of claim 5 wherein the vapor barrier layer comprising ethylene vinyl acetate copolymer, ethylene acid copolymer or ionomer thereof, ethylene (meth)acrylate copolymer, polyamide, polyester, ethylene vinyl alcohol copolymer, or combinations of two or more thereof.

7. The article of claim 5 wherein the vapor barrier layer comprises ethylene vinyl acetate copolymer.

8. The article of claim 5 wherein the vapor barrier layer comprises ethylene (meth)acrylate copolymer.

9. The article of claim 5 wherein the vapor barrier layer comprises ethylene acid copolymer or ionomer thereof.

10. The article of claim 5 wherein the vapor barrier layer comprises polyamide.

11. The article of claim 2, at least 70% of the acidic groups in the ethylene copolymer and the organic acid are neutralized.

12. The article of claim 5, at least 70% of the acidic groups in the ethylene copolymer and the organic acid are neutralized.

13. The article of claim 7, at least 70% of the acidic groups in the ethylene copolymer and the organic acid are neutralized.

14. The article of claim 9, at least 70% of the acidic groups in the ethylene copolymer and the organic acid are neutralized.

15. The article of claim 6 wherein the organic acid is substituted with one alkyl group, which is optionally isostearic acid.

16. The article of claim 6 wherein the organic acid is stearic acid, behenic acid, hydroxy stearic acid, or combinations of two or more thereof.

17. The article of claim 16 wherein the carrier is paper, paper board, nonwoven material, plastic, fiber board, cement board, fiber insulation batt or slab, foam insulation slab, or combinations of two or more thereof.

18. The article of claim 17 wherein the article further comprises fiber insulation batt or slab or foam insulation slab.

19. The article of claim 18 wherein the carrier is paper.

20. The article of claim 18 wherein the vapor barrier is a facing sheet for the fiber insulation batt or slab or foam insulation slab.

* * * * *